United States Patent
Smith et al.

(10) Patent No.: US 11,325,795 B1
(45) Date of Patent: May 10, 2022

(54) SYSTEMS AND METHODS FOR MODIFYING LOADING DOCK ENVIRONMENTS TO ENABLE TRAILER SWING DOORS TO OPEN INSIDE OF A LOADING DOCK

(71) Applicant: Outrider Technologies, Inc., Golden, CO (US)

(72) Inventors: Andrew F. Smith, Bend, OR (US); Lawrence S. Klein, Bend, OR (US); Joseph A. Welsh, Golden, CO (US); JohnDavid A. Arnott, Downers Grove, IL (US); Chandler R. Deimund, Edwards, CO (US)

(73) Assignee: Outrider Technologies, Inc., Golden, CO (US)

( * ) Notice: Subject to any disclaimer, the term of this patent is extended or adjusted under 35 U.S.C. 154(b) by 74 days.

(21) Appl. No.: 16/937,368

(22) Filed: Jul. 23, 2020

Related U.S. Application Data

(60) Provisional application No. 62/877,349, filed on Jul. 23, 2019.

(51) Int. Cl.
*B65G 69/28* (2006.01)

(52) U.S. Cl.
CPC .................. *B65G 69/2876* (2013.01)

(58) Field of Classification Search
CPC .............. B65G 69/2876; B65G 69/287; B65G 69/2894; B65G 69/28; B65G 69/2805; B65G 69/003; B65G 69/006
See application file for complete search history.

(56) References Cited

U.S. PATENT DOCUMENTS

| | | | |
|---|---|---|---|
| 6,279,276 B1 * | 8/2001 | Knoll | B65G 69/2876 160/205 |
| 2011/0010871 A1 * | 1/2011 | Metz | B65G 69/2876 14/69.5 |
| 2011/0061185 A1 * | 3/2011 | Kimener | B65G 69/2817 14/71.1 |

* cited by examiner

*Primary Examiner* — Abigail A Risic
(74) *Attorney, Agent, or Firm* — Loginov & Associates, PLLC; William A. Loginov

(57) ABSTRACT

Systems and methods for the modification of loading dock environments are provided that allow trailers and shipping containers on chassis' to park at a loading dock with closed doors and have these doors opened into the loading dock environment and resealed while the trailer remains at the loading dock.

12 Claims, 5 Drawing Sheets

US 11,325,795 B1

SYSTEMS AND METHODS FOR MODIFYING LOADING DOCK ENVIRONMENTS TO ENABLE TRAILER SWING DOORS TO OPEN INSIDE OF A LOADING DOCK

RELATED APPLICATION

This invention claims the benefit of U.S. Provisional Application Ser. No. 62/877,349, entitled SYSTEMS AND METHODS FOR MODIFYING LOADING DOCK ENVIRONMENTS TO ENABLE TRAILER SWING DOORS TO OPEN INSIDE OF A LOADING DOCK, filed Jul. 23, 2019, the teachings of which are expressly incorporated herein by reference.

FIELD OF THE INVENTION

This invention relates to swing door trailers and shipping containers on chassis used to haul cargo around a shipping facility, a production facility or yard, and more particularly to the opening and closing of swing doors at loading dock environments.

BACKGROUND OF THE INVENTION

In distribution center environments, it is becoming more preferable to perform trailer swing door operations once a trailer has already been parked at a loading dock. One large reason for this is the increase in facility autonomy. With the absence of truck drivers, who have historically been responsible for opening swing doors prior to reversing to a loading dock, a modified dock that allows trailer swing doors to open inside of the loading dock environment is a big plus. In order for this to be successful with certain loading dock environments, often it is necessary to make modifications the loading dock design. Various commercially available systems have been developed to facilitate automated docking, motivated by the myriad benefits, such as human and product safety, operational efficiency, and autonomous technology compatibility, several of which are so-called "drive-through" concepts and technologies. Examples of such vendors include Rite-Hite, Dockzilla, and Blue Giant. However, to date, there have not been any that exhibit low construction impact, low cost, and otherwise avoid equipment-intensive installations. Hence, such a solution is highly desirable.

SUMMARY OF THE INVENTION

This invention overcomes disadvantages of the prior art by providing systems and methods for the modification of loading dock environments that would allow trailers and shipping containers on chassis' to park at a loading dock with closed doors and have these doors opened into the loading dock environment and resealed while the trailer remains at the loading dock.

In an illustrative embodiment, a system and method for modifying a loading dock is provided. It includes, removing material from each of opposing edges of a loading dock pit to accommodate locking lugs of trailer swing doors when swung open. The leveler deck in the pit (also termed "pit leveler deck") is adapted to be lowered to a position that enables the locking lugs to pass over the deck while being swung open toward the shelves. A restraint is also provided, which maintains the doors in the swung open position. The deck can be adapted by arranging safety legs of the deck so as to be movable out of a supporting position. A tool can also be provided for a user, which removably engages a link attached to the safety legs and selectively moves the legs out of the supporting position upon actuation of the tool. Illustratively, the tool comprises an angled bar having a handle adjacent to a proximal end and a hook, for engaging the link, adjacent to an opposing distal end. The bar can include wheels that provide a fulcrum adjacent to an angled joint in the bar. Illustratively, the deck includes a hole enabling the hook to access the link, the link can comprise a chain or cable interconnected with the legs. The restraint can be adapted to locate the swing door so as to be generally behind by a protective device. It can comprise a cable, chain, strap, rope bungee cord or other acceptable device. Additionally, the protective device can comprise a newly placed, or pre-existing, bollard or other upright projecting structure.

In an illustrative embodiment, a loading dock comprises opposing edges of a loading dock pit that accommodate locking lugs of trailer swing doors when swung open. A leveler deck in the pit is adapted to be lowered to a position, which enables the locking lugs to pass over the deck while being swung open toward the shelves, and a restraint maintains the doors in the swung open position. Illustratively, the safety legs of the deck are adapted so as to be movable out of a supporting position. A tool can be provided that removably engages a link attached to the safety legs and that selectively moves the legs out of the supporting position upon actuation of the tool. The tool can comprise an angled bar having a handle adjacent to a proximal end and a hook, for engaging the link, adjacent to an opposing distal end. The bar can include wheels that provide a fulcrum adjacent to an angled joint in the bar, and/or the deck includes a hole enabling the hook to access the link. The link can comprise a chain or cable interconnected with the legs. The restraint is adapted to locate the swing door so as to be generally behind by a protective device. The protective device can comprise a bollard or other upright projecting structure.

In an illustrative embodiment, a tool for use in a loading dock having opposing edges of a loading dock pit that accommodate locking lugs of trailer swing doors when swung open, a leveler deck in the pit adapted to be lowered to a position that enables the locking lugs to pass over the deck while being swung open toward the shelves, a restraint that maintains the doors in the swung open position, wherein the safety legs of the deck are adapted so as to be movable out of a supporting position is provided. The tool is constructed and arranged to removably engage a link attached to the safety legs and to selectively move the legs out of the supporting position upon actuation of the tool. Illustratively, the tool can comprise an angled bar having a handle adjacent to a proximal end and a hook, for engaging the link, adjacent to an opposing distal end, and the bar includes wheels that provide a fulcrum adjacent to an angled joint in the bar.

BRIEF DESCRIPTION OF THE DRAWINGS

The invention description below refers to the accompanying drawings, of which.

DETAILED DESCRIPTION

Figure 1:
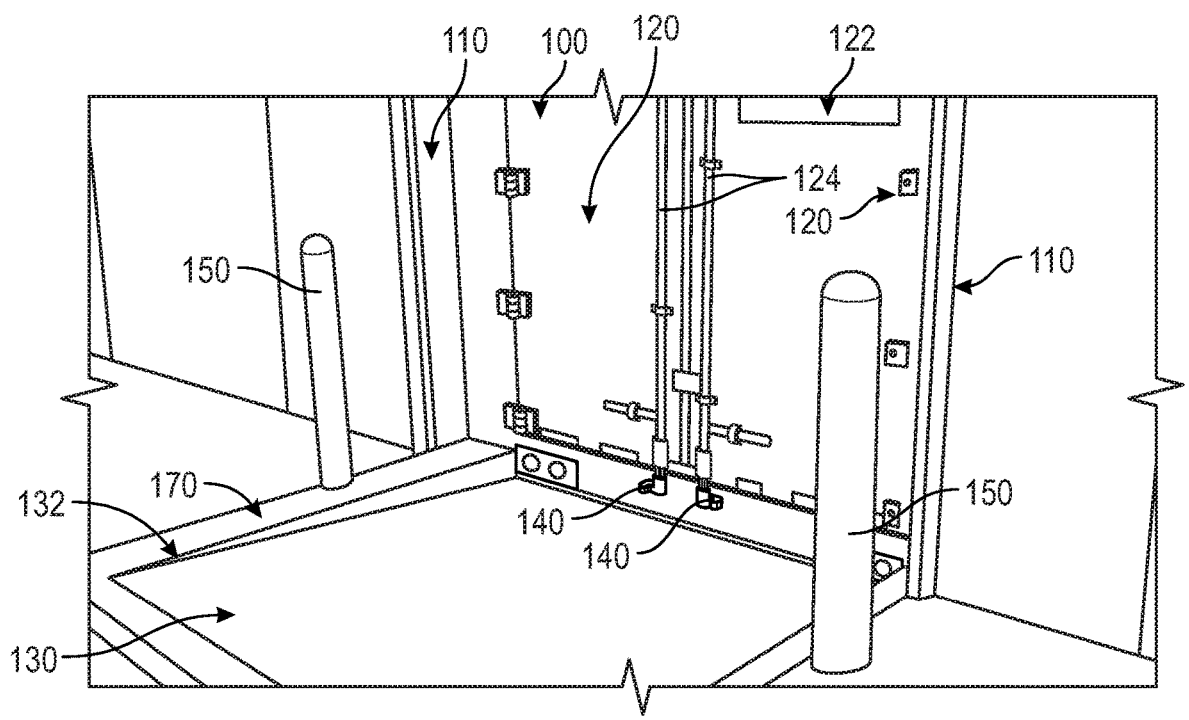
FIG. 1 is a diagram of a loading dock environment and exemplary trailer by way of example of the principles of the system and method.
Figure 2:
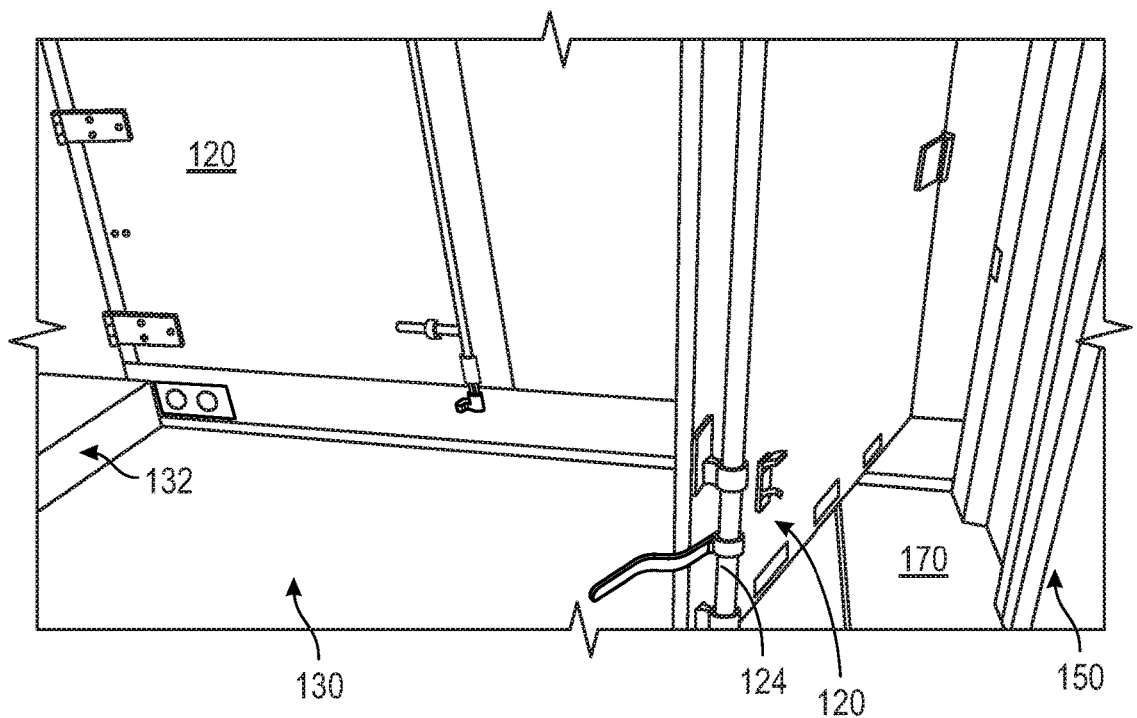
FIG. 2 is a more detailed diagram of an opened trailer door and associated locking mechanism for the exemplary trailer of FIG. 1.
Figure 3:
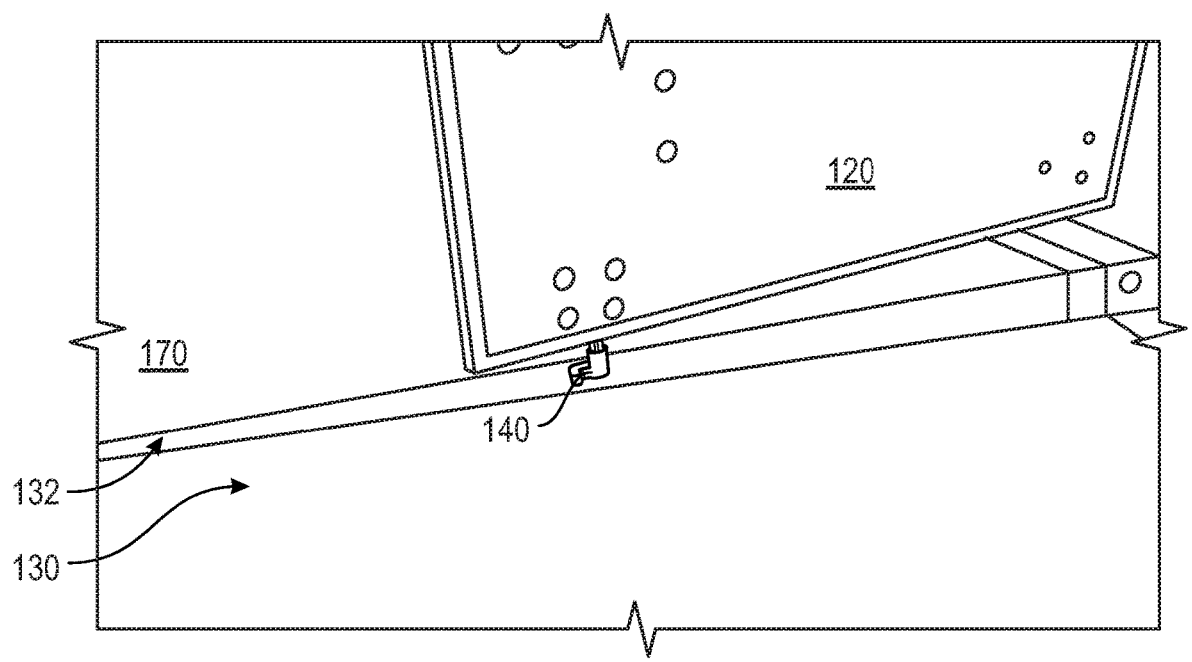
FIG. 3 is a more detailed diagram of the bottom end of a swing door of the exemplary trailer of FIG. 1 showing interference between the locking lug of the locking cam rod and the edge of the loading dock pit, while the pit leveler deck is in a lowered position to allow clearance for the lug.

FIG. 1 shows an interior view of a loading dock environment 100 in which the system and method herein is employed. The environment 100 includes a door frame 110 that defines (or is rebuilt to define) sufficient width and height so that the outer perimeter of the doors 120 of the exemplary trailer 122 can reside within the frame 110. The doors 120 each include one or more cam locks and rods 124 of conventional design. These locks are shown as manually operable (FIG. 2 below) to allow the doors to unlock and swing open. A dock pit leveler plate or deck 130 is typically provided within a surrounding pit 132 formed in the concrete. In a conventional implementation, the pit leveler deck 130 is provided on legs, and can be raised and lowered as appropriate to align with a given trailer floor height. At full height, as shown in FIG. 3, the leveler deck 130 can effectively block the inward swing of the doors 120 by interference with the bottom cam lock lugs 140 of the locking rods 124. However, most leveler decks 130 can be lowered sufficiently to allow for clearance of these cams as shown in FIG. 3.

Figure 6:
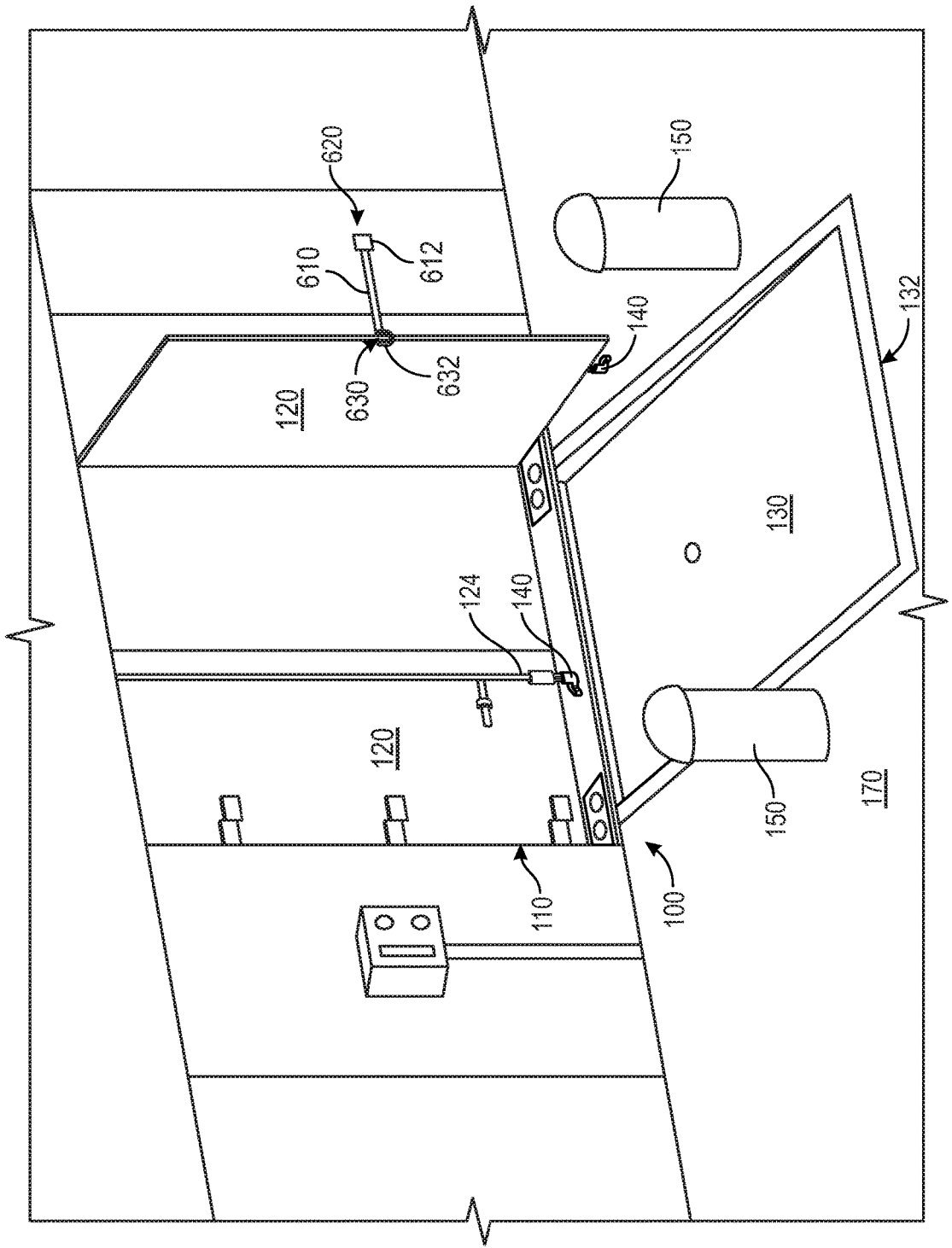
FIG. 6 is a diagram of the loading dock environment of FIG. 1 showing doors of the exemplary trailer opened, secured and protected from damage.

The dock environment 100 also typically includes bollards 150 on each of opposing sides of the well or pit 132. These are typically arranged at sufficient width to avoid interference with doors 120 as they swing open, and can provide an effective engagement surface for securing doors once they are swung open. More particularly, it is desirable to protect the swing doors during warehouse processes, such as trailer loading and unloading operations. Once the swing doors are fixed in the open position, they are susceptible to impact or snagging by forklifts or pallets, etc. In order to avoid this hazard, an impact protection device, such as the bollard (or another form of rail, and/or more general deflector device is placed on the leading edge (near the frame 110) of the pit 132, so that the swing door 120 is protected behind and away from the mounted protection device/bollard (FIG. 6).

In an exemplary embodiment, each of the doors 124 can be affixed in the open position by an adjustable or flexible strap 610 (FIG. 6) that has a distal end 612 affixed to a bollard 150, wall 620 (as shown herein) or other fixed object, while the proximal end 630 of the strap 610 has an end-effector, such as a hook 632, that attaches to the leading edge of the swing door 120 or around the cam lock bar 124, such that its tension maintains the door 120 in an open position.

Figure 4:
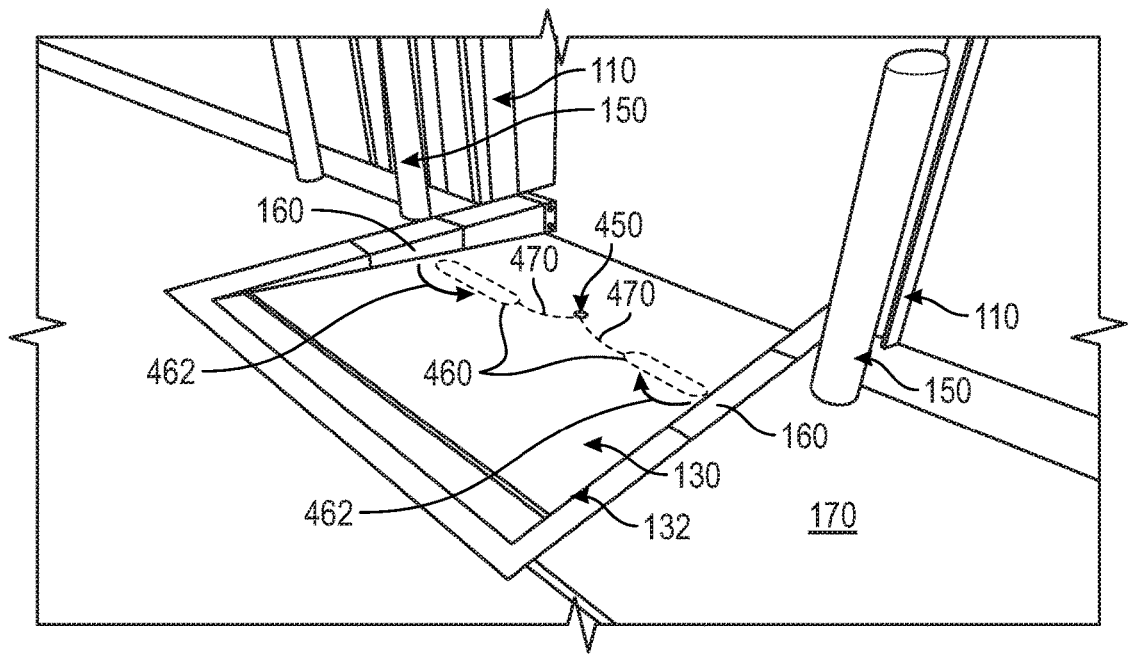
FIG. 4 is a more detailed diagram of the loading dock environment of FIG. 1 showing the pit leveler deck in a lowered position and the locations of two cutout shelves to allow the doors to swing into a fully opened position in engagement with adjacent protective structures (e.g. bollards) according to the illustrative system and method herein.
Figure 5:
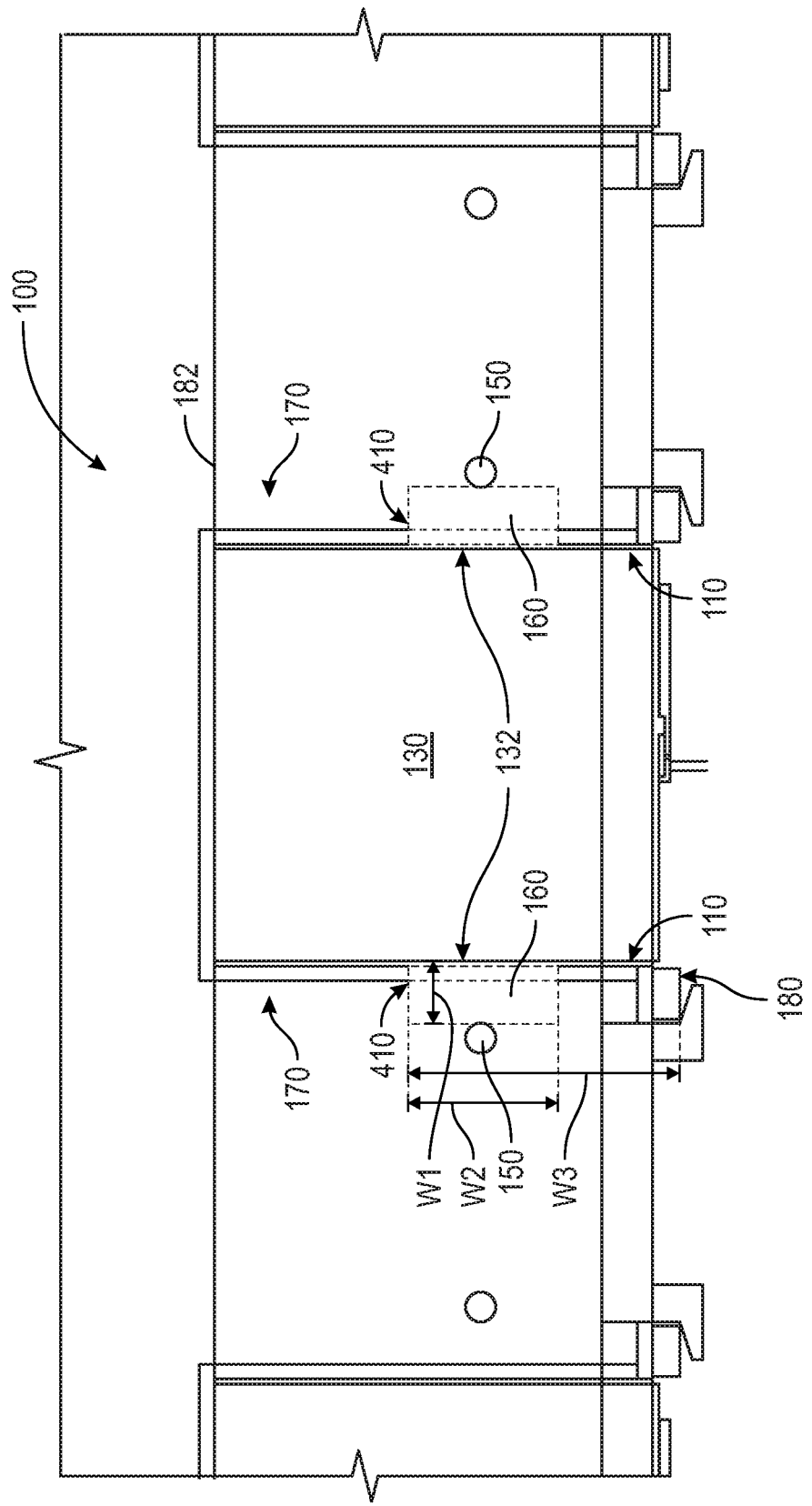
FIG. 5 is a plan view of the loading dock environment of FIG. 1 showing locations and dimensions of the shelves of FIG. 4 according to the illustrative system and method herein.

To allow the doors 120 to swing more fully out of the pit 132, in an exemplary embodiment, the edge of the pit is modified to accommodate, and remove interference with, the door cam lock lugs 140. As shown in FIGS. 4 and 5, the concrete edges of the pit 132 are cut down approximately 3-4 inches in depth below the level of the concrete floor 170 surrounding the pit 132, and define a well that is approximately 24-48 inches in length, approximately 12-16 inches in width) to create a lowered shelf 160. The existing concrete construction joint (by way of example) 180 is shown at the rear edge of each pit 132. The shelves 160 are located on each opposing side 132 of the pit 132 as shown. As shown (FIG. 4), the rear edge 410 of each shelf 160 is set back approximately 4-6 feet from the front of the door frame 110. The length of the shelf should be sufficient to accommodate doors with multiple locking rods and associated cam lock lugs. More particularly, the cut-down shelves 160 reside such that the swing door 120, or primarily the cam lock lug 140 of the door latch rod 124, can open and clear the area defined by the pit 132, to then be pinned back against to bollards 150 or other protective structure. Once pinned back, the pit leveler deck 130 can again be raised up to position that confronts the floor of the trailer 122, while not damaging the opened swing doors 120. Note, in various embodiments, the depth, length, and width of the concrete cut for each shelf can be tailored more specifically, depending upon the existing dock environment, as well as the make and model of the trailer being docked.

As shown in FIG. 5, the cut-down shelves can have a width W1 of approximately 10-12 inches (e.g. 11.5 inches in an embodiment), a length of approximately 2-3 feet (e.g. 2.5 feet in an embodiment) and a dock front (180) to rear-end setback W3 of approximately 4-5 feet (e.g. 4.5 feet in an embodiment). These dimensions are highly variable in alternate embodiments.

Figure 7:
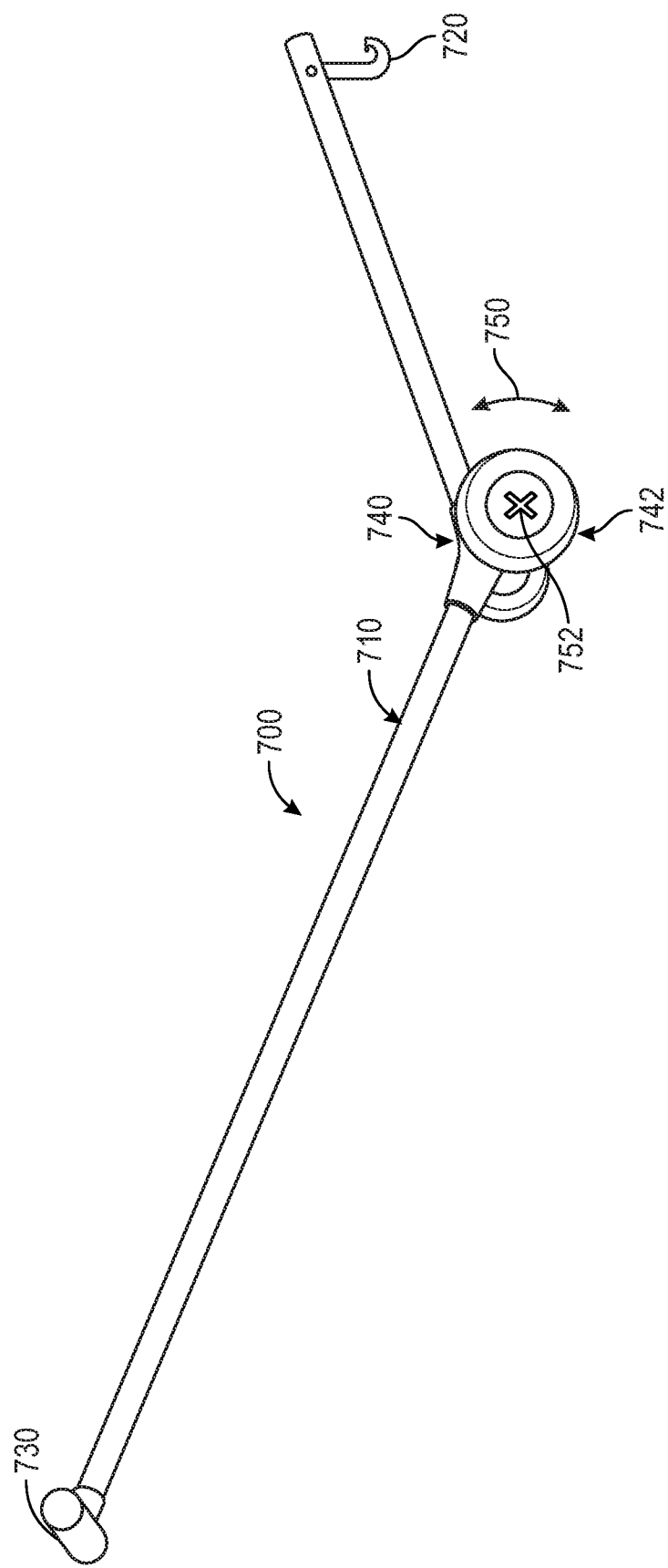
FIG. 7 is a diagram of a pit leveler deck tool that allows selective lowering and raising of the pit leveler deck when doors are to be swung open, in accordance with an exemplary embodiment of the illustrative system, and method herein.

It is contemplated that the pit leveler deck 130 should be lowered to allow the doors to swing (both opened and closed (after completion of a loading/unloading task) and raised during and after the loading/unloading task is complete. FIG. 7 shows a tool 700 that allows for reduced operating costs and entails minimal disruption in dock operations. The tool 700 consists of an angled bar 710 with a sturdy metal hook 720 on the distal end and a (e.g. T-shaped) handle 730 on the proximal end. At the angle joint 740 is a set of relatively small wheels 742 that act as a fulcrum and allow the user to push down on the T-handle 730, and thereby pivot (double-curved arrow 750) the tool 700 about the wheel axis 752. In operation, the hook 720 of the tool 700 removably engages a pull-chain or cable 470 (shown in phantom beneath the deck 130), located in the center (e.g. via hole 450 in FIG. 4) of the pit leveler deck 130 and, when pulled by pressing down on the T-handle 730, folds/pivots (curved arrows 462), on appropriate pivot axes the pit leveler safety legs (shown in phantom beneath the deck 130). By pivoting the legs 460 to fold them, it allows the pit leveler deck 130 able to drop down to its bottom-most position (as shown, e.g. in FIG. 4). In this lowered position, the vast majority of trailer swing doors are able to clear the deck 130 of the pit leveler. The specific arrangement of legs and chain/cable beneath the deck 130 can vary widely (e.g. it can also include sheaves, pulleys, etc. to guide the chain/cable), so long as the interconnection allows the legs to pivot out of an upstanding position upon actuation by a tool or other device. Note that in alternate embodiments, a more complex mechanism can raise and lower the deck such as a motorized screw drive, hydraulic ram, etc. In the depicted embodiment, the legs can be reset (if desired) by lifting the deck 130 sufficiently to allow the legs 460 to fall back into an upstanding position based upon their own weight. After the legs 460 are stood back up the deck 130 can be lowered back into its raised position supported by the upright legs.

Note that the tool can be relatively lightweight as the force required to drop the legs is relatively minimal. In an embodiment, the bar 710 is constructed from hollow, square, round, or rectangular (or another shape) aluminum alloy or steel bar stock with sufficient bend-resistance to avoid permanent/plastic deformation under stresses encountered in normal operation. Note in alternate arrangements, the bar can have a different shape, other than the depicted angled shape, such as an upwardly curved shape. In general, the shape provides a fulcrum at a mid-section, with an elevated (off ground level) handle adjacent to a proximal end and an elevated hook adjacent to a distal end. The hook can be attached directly to the end or depend from a predetermined length lead—for example a chain or cable.

In an alternate embodiment, instead of lowering shelf segments (160) of the warehouse floor by cutting concrete, or in some instances, in addition to cutting, the system and method can entail constructing a low ramp under the tires of the trailer in front of the dock opening. While the ramp typically only needs to be approximately 2-4 inches in overall height, it accommodates for a few edge-case (outlier) trailers in a fleet that are lower-slung, and their doors may not be able to otherwise clear the pit leveler deck in its bottom-most position.

Another embodiment of the illustrative system and method entails cutting and widening of a dock door frame (110) to allow for more room for a trailer to be parked of-center, and still allow for swinging of its doors beyond 90 degrees, whilst clearing the pit leveler.

In operation, the following steps of a trailer loading/unloading method herein can be employed:

1. Trailer arrives at the dock and pit leveler deck is lowered to its bottom-most position using the ergonomic tool or another actuation mechanism.
   (a) Raise pit leveler off of the safety legs using the tool by activating pit leveler pull chain to release safety legs, and lower leveler to bottom-most position (or position sufficient to provide clearance for lugs).
   (b) Once leveler is lowered using the tool, trailer doors clear pit leveler deck and are swung open.
2. With no modifications made to existing dock door opening; with pit leveler deck lowered, vast majority of trailer doors swing open and clear the edge of the pit. However, in many instances, the swing door's bottom cam lock lug makes contact with the concrete sill edge of the pit.
3. Concrete on sill edge of pit has been previously cut down to allow the lug to clear the edge of the pit and the door is swung clear of the active warehouse loading zone.
   (a) The cut is a small section of concrete 3-4 inches deep/thick, 12-16 inches wide, and 24-4 inches long to create opposing shelves in the sill edge. Doors can now be swung past the sill edge with clearance for the lugs. Thus, such minor concrete cutting along both sills of existing pit allows swing doors to be able to sweep out of the way of conventional dock loading equipment.
   (b) For safety purposes, once swung out the swing doors can be secured to the existing bollard and a leading-edge guard is added to protect the open trailer door.
4. Pit leveler deck can be raised back into position using the tool or another device and loading or unloading task occurs using loading dock equipment and/or personnel.
5. When loading or unloading task is complete, pit leveler deck is again lowered using the tool (if previously raised in step 4) and swing doors are detached and swung back to closed position on trailer and locked. Pit leveler can again be raised using the tool. Trailer departs the dock.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Also, qualifying terms such as "substantially" and "approximately" are contemplated to allow for a reasonable variation from a stated measurement or value can be employed in a manner that the element remains functional as contemplated herein—for example, 1-5 percent variation. Accordingly, this description is meant to be taken only by way of example, and not to otherwise limit the scope of this invention.

What is claimed is:

1. A method for modifying a loading dock comprising the steps of:
   removing material from each of opposing edges of a loading dock pit to accommodate locking lugs of trailer swing doors when swung open;
   adapting a leveler deck in the pit to be lowered to a position that enables the locking lugs to pass over the deck while being swung open toward the shelves; and
   providing a restraint that maintains the doors in the swung open position.

2. The method as set forth in claim 1 wherein the step of adapting includes arranging safety legs of the deck so as to be movable out of a supporting position.

3. The method as set forth in claim 2 wherein the step of arranging includes providing a tool that removably engages a link attached to the safety legs and selectively moves the legs out of the supporting position upon actuation of the tool.

4. The method as set forth in claim 3 wherein the tool comprises an angled bar having a handle adjacent to a proximal end and a hook, for engaging the link, adjacent to an opposing distal end.

5. The method as set forth in claim 4 wherein the bar includes wheels that provide a fulcrum adjacent to an angled joint in the bar.

6. The method as set forth in claim 5 wherein the deck includes a hole enabling the hook to access the link.

7. The method as set forth in claim 6 wherein the link comprises a chain or cable interconnected with the legs.

8. The method as set forth in claim 1 wherein the restraint is adapted to locate the swing door so as to be generally behind by a protective device.

9. The method as set forth in claim 8 wherein the protective device comprises a bollard or other upright projecting structure.

10. The method as set forth in claim 1 wherein the material removed comprises 3-4 inches from each of the opposing edges in depth below a level of a concrete floor surrounding the loading dock pit.

11. The method as set forth in claim 10 wherein the material removed is 24-48 inches in length and 12-16 inches in width.

12. The method as set forth in claim 3, further comprising:
   raising the leveler deck in the pit using the tool prior to a loading or unloading operation; and
   lowering the leveler deck in the pit using the tool subsequent to the loading or unloading operation.

* * * * *